US012641386B2

(12) United States Patent
Oclee-Brown

(10) Patent No.: US 12,641,386 B2
(45) Date of Patent: May 26, 2026

(54) LOUDSPEAKERS

(71) Applicant: GP Acoustics (UK) Limited, Maidstone (GB)

(72) Inventor: Jack Anthony Oclee-Brown, Staplehurst (GB)

(73) Assignee: GP Acoustics (UK) Limited, Maidstone (GB)

( * ) Notice: Subject to any disclaimer, the term of this patent is extended or adjusted under 35 U.S.C. 154(b) by 295 days.

(21) Appl. No.: 18/208,589

(22) Filed: Jun. 12, 2023

(65) Prior Publication Data

US 2024/0031751 A1 Jan. 25, 2024

(30) Foreign Application Priority Data

Jul. 22, 2022 (GB) ..................................... 2210734

(51) Int. Cl.

*H04R 29/00* (2006.01)
*H04R 9/04* (2006.01)
*H04R 9/06* (2006.01)

(52) U.S. Cl.

CPC ........... *H04R 29/003* (2013.01); *H04R 9/046* (2013.01); *H04R 9/06* (2013.01)

(58) Field of Classification Search

None

See application file for complete search history.

(56) References Cited

U.S. PATENT DOCUMENTS 1,707,570 A 4/1929 Rice
3,941,932 A 3/1976 D'Hoogh
4,256,923 A * 3/1981 Meyers .................. H04R 3/002 381/96
5,197,104 A * 3/1993 Padi ......................... H04R 9/04 381/401
7,509,180 B2 * 3/2009 Abrams, Jr. ........... H04H 60/23 381/117

(Continued)

FOREIGN PATENT DOCUMENTS

CN 111970825 A 11/2020
EP 0134092 A2 3/1985
EP 0478979 A2 4/1992

(Continued)

OTHER PUBLICATIONS

Vocabulary.com, https://www.vocabulary.com/dictionary/winding (last accessed Nov. 12, 2025). (Year: 2025).*

(Continued)

*Primary Examiner* — Walter F Briney, III

(74) *Attorney, Agent, or Firm* — Westman, Champlin & Koehler, P.A.; Z. Peter Sawicki; Amanda M. Prose

(57) ABSTRACT

Apparatus and methods for a velocity-sensing approach to loudspeaker motional feedback comprising providing a first magnetic field to couple primarily with the voice coil to drive the voice coil, providing a second magnetic field to couple primarily with the sensing winding, and sensing the voltage induced in the second, sensing winding as it reciprocates in the second magnetic field. The second magnetic field has an orientational periodicity which is circumferential in relation to the reciprocation axis and this orientational periodicity extends over at least a part of the length of the former along the reciprocation axis.

18 Claims, 9 Drawing Sheets

(56) References Cited

U.S. PATENT DOCUMENTS 9,130,445 B1 * 9/2015 Katz .................. H02K 41/0356

FOREIGN PATENT DOCUMENTS

| | | | |
|---|---|---|---|
| GB | 1534842 | A | 12/1978 |
| JP | S55121795 | A | 9/1980 |
| JP | S5972899 | A | 4/1984 |
| JP | H1032897 | A | 2/1998 |
| JP | 2001275185 | A | 10/2001 |

OTHER PUBLICATIONS

Vocabulary.com, https://www.vocabulary.com/dictionary/around (last accessed Nov. 12, 2025). (Year: 2025).*

Search Report issued for GB patent application serial No. GB2210734.6, dated Jan. 19, 2023.

* cited by examiner

LOUDSPEAKERS

FIELD OF THE INVENTION

The present invention relates to the field of loudspeakers, and in particular to sensing the instantaneous velocity of the voice coil and voice coil former which in use reciprocate so as to drive the acoustic diaphragm from which acoustic waves are radiated. The invention relates to methods of loudspeaker design and to loudspeakers and to voice coil formers therefor.

BACKGROUND ART

There are many types of conventional acoustic loudspeakers which convert an electrical audio signal into a corresponding sound; a loudspeaker usually comprises one or more drivers, an enclosure, and electrical connections and often circuitry such as a crossover network. The drivers with which this invention is concerned are voice coils, i.e. coils of electrically conductive wire, wound in a spiral around a rigid and usually cylindrical former. These drivers are located within a magnetic field and, when an electrical audio signal is passed through the voice coil, caused to reciprocate and to drive the acoustic diaphragm to radiate acoustic waves. Such arrangements have been in use for a century, having been the subject of U.S. Pat. No. 1,707,570, for example.

Ideally for a loudspeaker the motion of the voice coil would be linearly related to the electrical signal applied to the loudspeaker driver terminals, such that if a signal composing one or more sinusoids is applied to the loudspeaker the resulting motion of the voice coil is composed only of the same set of sinusoids. However, in real devices, this is not the case and there is significant non-linearity in the transfer function. The result is that when one or more sinusoids is applied to the loudspeaker driver terminals the resulting voice coil motion also contains harmonics at multiples and sum and difference frequencies of the applied sinusoids. This behaviour is not desirable for high-quality sound reproduction.

The non-linear behaviour is due to the modulation of transfer function parameters during the operation of the loudspeaker, and in particular modulation as a function of the voice coil current, voice coil temperature and voice coil and diaphragm displacement. The main mechanisms causing non-linearity are typically:

- the suspension and surround stiffness varying as a function of the voice coil position;
- the motor system strength (BL) varying as a function of the voice coil position;
- the resistance of the voice coil wire varying as a function of the voice coil temperature, and
- the variation of the voice coil inductance as a function of the voice coil position as a function of the state of the magnetic circuit in the motor system, itself a function of and present and past voice coil position and voice coil current.

One approach adopted in loudspeaker design is to try and minimise these mechanisms, but this approach usually adds significant extra cost and complexity. Another approach to reducing the non-linearities in a loudspeaker driver is to sense the motion of the voice coil and to use this sensed signal in a negative feedback loop (using an appropriate amplifier and control electronics). This second approach is commonly called 'motional feedback' and is well known, but is not in common use in commercial loudspeakers primarily due to the additional complexity of the arrangement, and the cost and performance of available motion sensors. U.S. Pat. No. 3,941,932 is one example of motional feedback which uses a piezoelectric accelerometer located under the driver dust-cap to sense the acceleration of the voice coil. Another well-known example of motional feedback places an additional sensing winding into the magnet motor gap, wound coaxially with the voice coil, as shown in FIG. 1.

In the conventional velocity-sensing motion feedback arrangement shown schematically in FIG. 1 as a cross-sectional side view, a loudspeaker has a ferrite ring magnet 2, a steel yoke 4 and a steel front plate 6 which combine to provide a magnetic gap 8 within which the voice coil former 10 reciprocates along axis 12 to drive the diaphragm (not shown). The voice coil 14 is wound around the voice coil former 10 in the conventional manner and extends along the axis 12 for sufficient distance to accommodate the reciprocal motion of the voice coil former 10, which is driven by energising the voice coil 14 with an electrical signal; the voltage applied to the voice coil 14 produces a magnetic field which interacts with the magnetic field in the magnetic gap 8 to drive the voice coil former 10 to move along the axis 12 in accordance with the well-known principles of electromagnetic induction. A sensing coil 16 of fine wire is wound coaxially with the voice coil 14; as the voice coil former 10 reciprocates in the magnetic gap 8 taking the sensing coil 16 with it, a voltage is induced in the sensing coil 16 by the magnetic field in the gap 8, and this voltage can be measured and used to determine the instantaneous velocity of the voice coil former 10.

The sensing winding moves along with the voice coil and in theory generates an output voltage that is proportional to the velocity of the voice coil movement due to the induced motional EMF, $\varepsilon_{motion}$, as the sensing windings pass through the magnetic field in the magnet motor gap, according to the equation:

$$\varepsilon_{motion}=(BL)_{SC}\dot{x} \tag{1.1}$$

where $(BL)_{SC}$ is the sensitivity coefficient (this is the average magnetic flux density crossing the sensing voice coil windings (B) multiplied by the length of the velocity-sensing winding wire (L)) and $\dot{x}$ is the velocity of the coil.

A motional feedback approach using a secondary winding has several advantages over the approach which uses accelerometers, namely:

- the sensed velocity can be almost exactly the axial voice coil motion up to a very high frequency and not include any parasitic self-resonance or resonance from the sensor mounting, as can often be a problem with other sensors such as accelerometers;
- the velocity-sensing winding has a low impedance output and doesn't require proximal electrical amplification on the moving parts of the driver;
- any rocking motion (i.e. motion which is not parallel to the reciprocating axis) of the moving driver parts will tend not to be sensed, because it results in one half of the velocity-sensing winding moving backwards and the other half moving forwards (this is an advantage because a small amount of rocking is common in many drivers and has little effect on performance), and
- the velocity-sensing winding doesn't carry any significant current and therefore a very fine wire can be used, this means that it occupies little space and adds insignificant mass to the moving assembly.

There are two major problems with the conventional velocity-sensing winding approach shown in FIG. 1 that significantly hamper performance and limit usage of this approach. Firstly, in order for the sensing voltage, Vs, to be linearly related to the voice coil velocity it is imperative that the sensitivity coefficient $(BL)_{SC}$ in equation 1.1 is constant. FIG. 1 is drawn with an overhung velocity-sensing winding arrangement such that the length A of the magnet motor gap is shorter than the length D of the velocity-sensing winding. This means that while the driver excursion (the movement of the driver away from its 'at rest' position, as shown in FIG. 1) is less than the distance C, the average flux density the sensing winding is subject to is almost constant. For excursions greater than distance C the average flux density varies (because only a part of the winding is inside the motor gap), so the sensitivity of the velocity-sensing winding drops dramatically. To address this cause of non-linearity the winding height of the velocity-sensing winding could be increased so that it exceeds the winding height of the voice coil, but this is not helpful because it would require the former length to be increased, adding to the weight of the driver and to the size of the loudspeaker, and the clearance between the former and the steel yoke would need to be increased to avoid collision during operation.

Secondly, an additional mutual emf is present at the terminals of the velocity-sensing winding due to the transformer-like coupling with the current flowing in the voice coil. A more accurate description of the velocity-sensing winding voltage is:

$$Vs = (BL)_{sc}\,\dot{x} + M\,\frac{di}{dt} \qquad 1.2$$

where M is the mutual inductance between the voice and velocity-sensing windings and i is the current flowing in the voice coil. This mutual inductance effect is well known and pollutes the sensed signal in a typical driver to the extent that the useful feedback bandwidth is significantly limited. FIG. 2 shows simulated velocity-sensing winding voltage and constituent EMFs for a typical low inductance loudspeaker with a velocity-sensing winding wound directly on top of the voice coil and clearly illustrates how at high frequencies the mutual inductance dominates the sensed voltage. A large dip in the sensing signal is present at the frequency where the motional and mutual emf have the same value.

The value of the mutual inductance is dependent upon the self-inductance of each of the coils and the magnetic coupling between the two coils, according to:

$$M=k(L_e L_{esc})^{1/2} \qquad 1.3$$

where $L_e$ is the self-inductance of the voice coil, $L_{esc}$ is the self-inductance of the velocity-sensing winding and k is a coupling coefficient that has a value between 0 and 1 describing the proportion of magnetic flux from one coil that is coupled to the other. The mutual emf is proportional to the squared number of turns in the voice and velocity-sensing windings, while the BL and $(BL)_{SC}$ is proportional to the number of turns. This means that the mutual emf is particularly high for drivers that have a high number of voice coil turns. For example, FIG. 3 (which show the measured velocity-sensing winding voltage and the actual velocity (measured by laser) for a loudspeaker with high inductance and strong coupling between the voice coil and the velocity-sensing winding) shows that in some cases the velocity signal is totally swamped by the mutual emf so that the audio quality is poor, and the arrangement is not usable for sensing velocity within the audio bandwidth. There is a need for a velocity-sensing motion feedback approach which is suitable for all loudspeakers including those with high inductance voice coils, and which addresses or ameliorates the problems of conventional systems.

SUMMARY OF THE INVENTION

This invention is predicated on the realisation that by providing a magnetic field which is predominantly radial so as to energise the voice coil to move axially, and also providing along at least a part of the voice coil axis, an auxiliary magnetic field which has a higher order of circumferential periodicity than the predominantly radial field, it is possible to provide a velocity sensing arrangement which is relatively compact, lightweight and straightforward to manufacture, and which does not suffer the problems of conventional velocity-sensing motion feedback devices to the same extent.

The present invention therefore provides a method of measuring the instantaneous velocity of a loudspeaker driver reciprocating in a magnetic field, the driver having a voice coil wound coaxially around a former and a sensing winding arranged coaxially around the former, the driver being driven so as to reciprocate along a reciprocation axis by the application of an electric signal to the voice coil, the method comprising providing a first magnetic field arranged and adapted to couple primarily with the voice coil, providing a second magnetic field arranged and adapted to couple primarily with the sensing winding, sensing the voltage induced in the second, sensing winding as it reciprocates axially in the second magnetic field, wherein the second magnetic field has an orientational periodicity which is circumferential in relation to the reciprocation axis and which orientational periodicity extends over at least a part of the length of the former along the reciprocation axis.

In this way, the magnetic circuit provides two flux distributions, one to interact with each of the voice coil and the sensing winding almost independently. The first flux distribution is the equivalent of the normal motor system magnetic gap optimised to maximally couple with the voice coil, with a substantially radial field. The second flux distribution is optimised to maximally couple with the sensing winding. The sensing winding is designed so that it is minimally coupled to the first region of concentrated magnetic flux and the second magnetic gap is designed and arranged relative to the voice coil so that the voice coil is minimally coupled to the second region of concentrated magnetic flux. The two magnetic fields, which can be embodied in several different ways (some of which are described below), allows there to be an overall magnetic field which varies in the plane perpendicular to the loudspeaker axis at one or more locations along the loudspeaker axis, which in turn enables different sensing winding arrangements to be employed for sensing the instantaneous velocity of the voice coil former when the loudspeaker is in use and which is an improvement over conventional velocity-sensing motion feedback loudspeakers. Loudspeakers in accordance with the principles of the invention show reduced non-linearity in the sensing voltage/voice coil velocity relationship and extremely low mutual inductance.

The first and second magnetic fields may be positioned at different locations along the axis. Additionally or alternatively, the first and second magnetic fields may be superimposed. Offsetting the two magnetic fields relative to the reciprocation axis helps increase the linear range of the sensing winding. Superimposing the magnetic fields permits a more compact design.

Such arrangements allow the sensing winding to be configured such that it doesn't interact with the magnetic drive field that is generated by the voice coil when the electric signal is applied to drive the voice coil (such as by ensuring that the sensing winding is perpendicular at substantially all points to the reciprocation axis). Consequently, the coupling factor between the voice coil and the velocity sensing winding will be close to zero and so the mutual inductance will be close to zero. The result is that the mutual emf will also be close to zero and the velocity sensing winding voltage is dominated by the motional emf signal, even for drivers that have very high inductance voice coils. The sensing winding is preferably configured so as to have a circumferential periodicity which matches that of the second magnetic field.

The first magnetic field may be predominantly radial relative to the reciprocation axis, and the second magnetic field may have a small circumferentially varying component, such that when the two magnetic fields are superimposed there is a baseline radial flux and, travelling circumferentially there are regions of radial flux which are slightly higher than the baseline radial flux, and regions radial flux which are of slightly lower than the baseline radial flux. If the two magnetic fields are not superimposed but instead separated axially, then the first magnetic flux is substantially constant around the circumference of the magnetic gap over the first axial distance, and circumferentially and over the second axial distance the second magnetic field has regions of slightly positive radial flux, and regions of slightly negative radial flux.

In another aspect, the invention also provides a loudspeaker comprising: a voice coil wound coaxially around a former which together are adapted, when an electric signal is applied to the voice coil, to reciprocate along a reciprocation axis within a gap in a magnet arrangement so as to cause an acoustic diaphragm connected to the former to reciprocate along the reciprocation axis and radiate acoustic energy, the voice coil extending a first distance along the axis and the former, and a sensing winding arranged coaxially around the former and extending a second distance along the reciprocation axis, in which the magnet arrangement is adapted and configured to generate two magnetic fields, a first magnetic field primarily for driving the voice coil to reciprocate and located axially adjacent the first distance, and a second magnetic field located axially adjacent the second distance and adapted to couple primarily with the sensing winding, and in which the sensing winding is arranged around the circumference of the former in the form of an even number of loops, the loops being separately disposed around the circumference of the former but electrically connected to form a single winding, each loop extending around a loop axis which is substantially perpendicular to the reciprocation axis.

The location of the loops around the circumference of the former provides the sensing winding with a circumferential periodicity of sensitivity; this sensitivity periodicity is preferably matched with periodicity of the second magnetic field.

The first and second magnetic fields and the first and second distances may not overlap in the direction of the reciprocation axis (but instead be offset along the reciprocation axis), or the first and second magnetic fields and the first and second distances may overlap in the direction of the reciprocation axis. As explained above, offsetting or superimposing the magnetic fields each have their advantages.

The second, sensing winding may be formed on the outer surface of the former in one or more layers comprising a plurality of separate coils disposed circumferentially about the former, each coil comprising a plurality of adjacent turns extending around a loop axis. The outer surface of the former may include the radially outermost surface of the former and/or its radially innermost surface. Circumferentially adjacent coils may turn in alternating directions about their respective axes, so as to align with the variations in radial flux magnitude, which variations may be produced by alternating radial magnetic polarity in the second magnetic field. The circumferentially invariant primary field and voice coil fields may result in induced voltage within individual loops, but due to the alternating polarity of the loops, no net EMF from the secondary winding formed by the loops will be produced.

Two or more coils may be provided in adjacent layers which are superimposed, or they may be superimposed, with the majority of the turns being provided in a single layer, and a minor part of each turn providing a crossover path in a second, adjacent layer where turns of one coil cross turns of another coil.

The sensing winding may comprise two or more printed layers, in which the printed coils in one layer are aligned circumferentially around the reciprocation axis with the printed coils in an adjacent layer. Preferably a portion of each coil is aligned perpendicularly to the reciprocation axis, and the turns in that portion of each coil may be spaced apart from each other relative to the reciprocation axis by a greater distance than are the turns forming the remainder of that coil. This allows the sensitivity coefficient $(BL)_{SC}$ to remain substantially constant over a very wide axial range of sensing winding positions. The first distance is preferably less than the second distance, which helps keep the sensitivity of the sensing winding constant along the reciprocation axis.

The magnet arrangement may comprise separate first and second magnets for generating the first and second magnetic fields, or there may be a single, unitary magnet adapted to generate a field equivalent to the combined first and second magnetic fields.

In a further aspect, the invention also provides a former for a loudspeaker voice coil to be wound coaxially around, the former and voice coil being adapted to reciprocate along a reciprocation axis within a gap in a magnet arrangement so as to cause an acoustic diaphragm connected to the former to reciprocate along the reciprocation axis and radiate acoustic energy, the former comprising a sensing winding formed on the outer and/or inner surface of the former in one or more printed circuit layers comprising a plurality of separate sensing coils disposed circumferentially about the former, each sensing coil comprising a plurality of adjacent turns, the sensing coils being separately disposed around the circumference of the former but electrically connected to form a single winding, each sensing coil extending around a loop axis which is substantially perpendicular to the reciprocation axis.

Such an arrangement is ideal for operation as a velocity-sensing winding in a magnetic gap created by a magnet arrangement which is adapted and configured to generate two magnetic fields, a first magnetic field primarily for driving the voice coil to reciprocate and a second magnetic field located axially adjacent the first magnetic field and adapted to couple primarily with the sensing winding. The former may comprise two or more printed layers, the printed coils in one layer being aligned circumferentially around the axis with the printed coils in an adjacent layer. A portion of each coil may be aligned perpendicularly to the reciprocation axis, the turns in that portion of each coil being spaced apart from each other by a greater distance relative to the reciprocation axis than are the turns forming the remainder of that coil.

BRIEF DESCRIPTION OF THE DRAWINGS

The invention will now be described by way of example and with reference to the accompanying figures, in which;

FIGS. 6*a* to 6*e* are schematic illustrations of the magnetic field in the loudspeaker of FIG. 4, FIGS. 6*a* and 6*b* show the direction of the magnetic field at different points along the axis of the loudspeaker while FIGS. 6*c* and 6*d* illustrate the two magnetic fields which combine at one or more points along the axis of the loudspeaker to produce the magnetic field shown in FIG. 6*e;*

DETAILED DESCRIPTION OF THE EMBODIMENTS

Figure 1A:
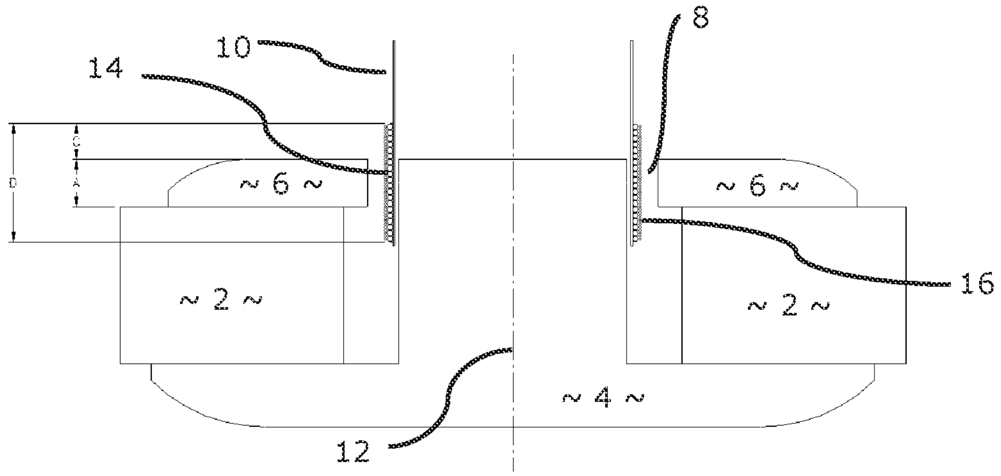
Fig 1(a) PRIOR ART
FIG. 1(*a*) is a schematic illustration of a loudspeaker with a conventional velocity-sensing winding.
Figure 2:
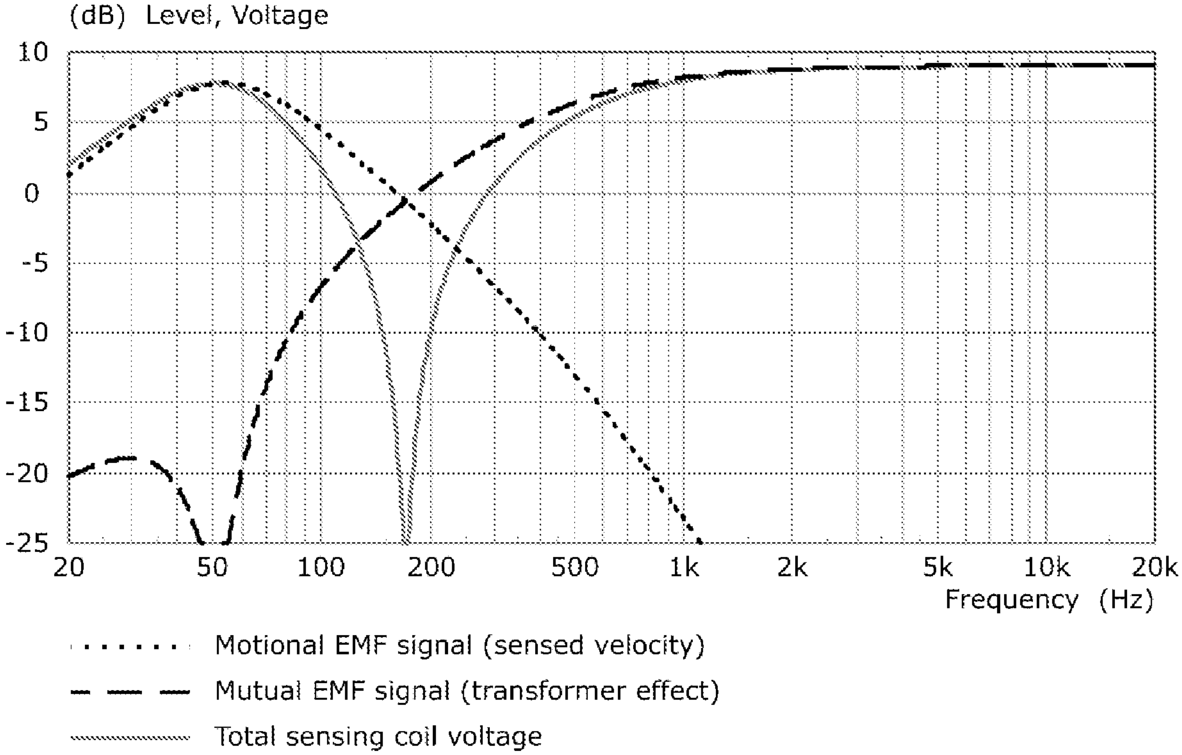
Fig 2 PRIOR ART
FIG. 2 is a graph showing the simulated velocity-winding voltage and constituent EMFs frequency response for the loudspeaker of FIG. 1.
Figure 3:
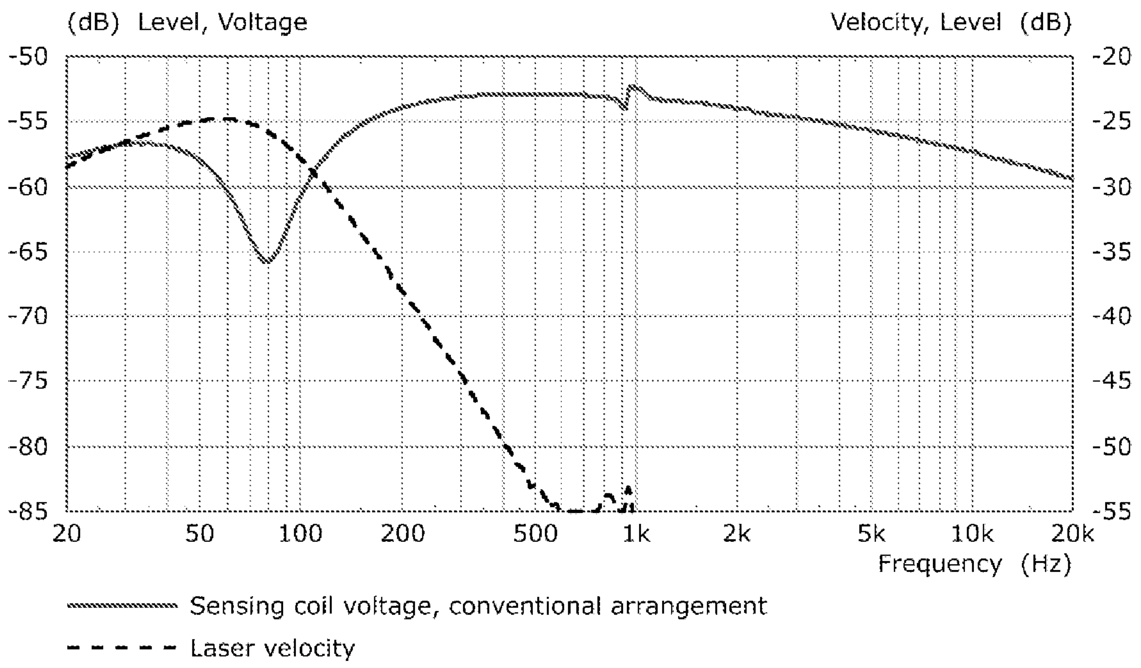
Fig 3 PRIOR ART
FIG. 3 is a graph showing the measured velocity-sensing winding voltage and the actual velocity for a conventional loudspeaker with high inductance and strong coupling between the voice coil and the velocity-sensing winding.

FIGS. 1 to 3 relate to the prior art and are described in the introduction above.

Figure 4:
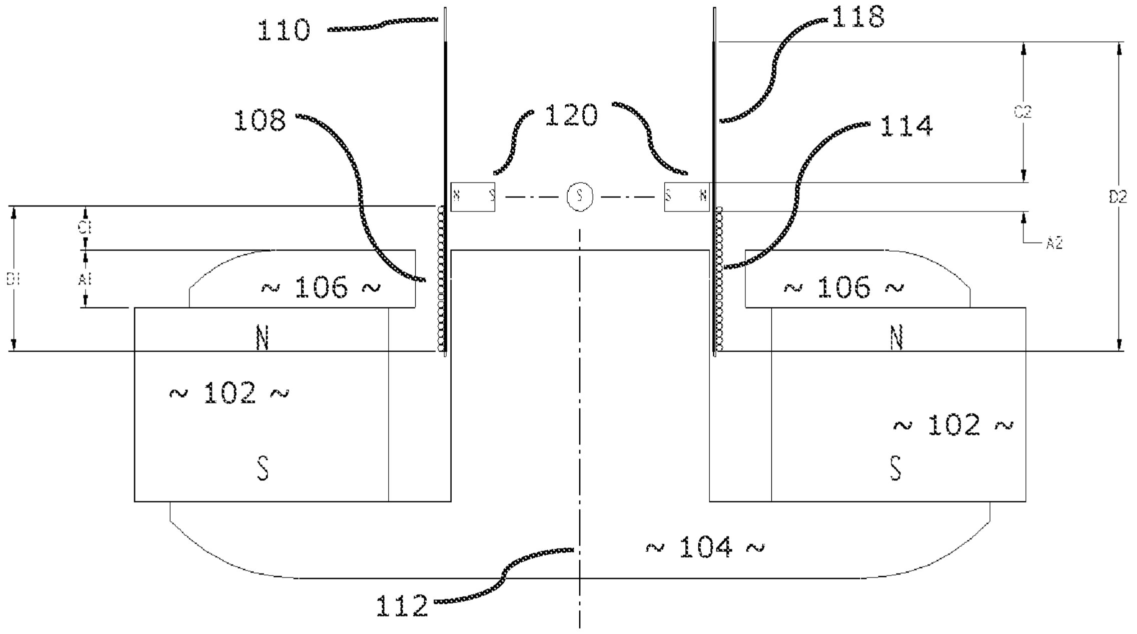
FIG. 4 is a schematic cross-sectional view of an embodiment of a velocity-sensing loudspeaker in accordance with the invention.
Figure 5:
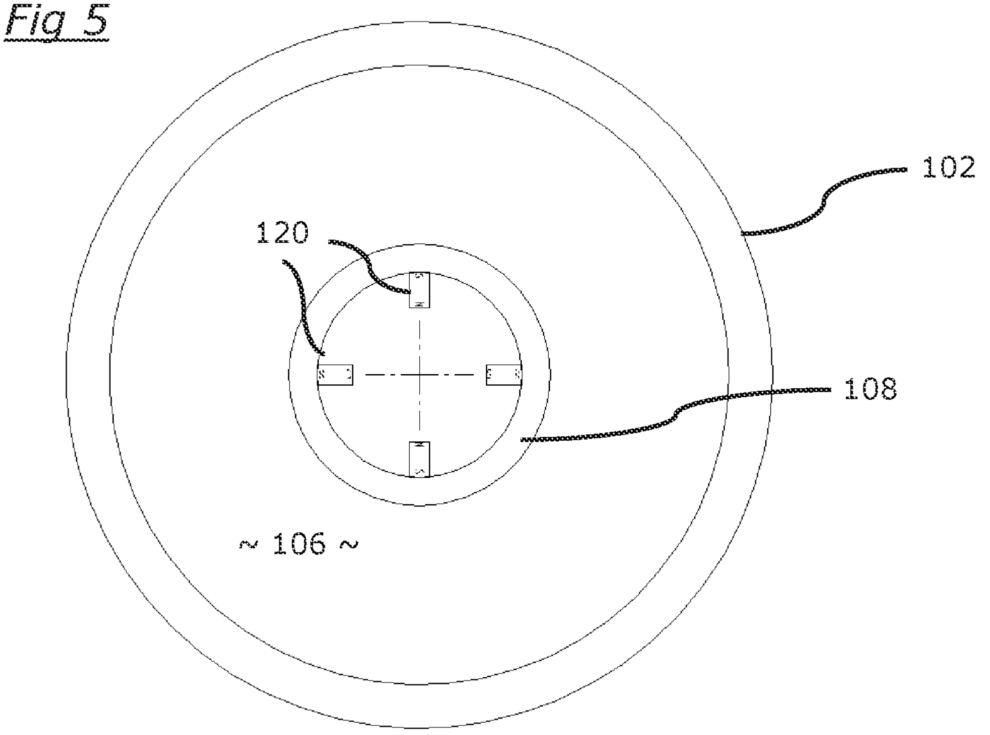
FIG. 5 is a schematic plan view of the loudspeaker of FIG. 4.

FIGS. 4 and 5 show an embodiment of a velocity-sensing loudspeaker in accordance with the invention; this loudspeaker has a ferrite ring magnet 102, a steel yoke 104 and a steel front plate 106 which combine to provide a magnetic gap 108 within which the voice coil former 110 reciprocates along axis 112 to drive the diaphragm (not shown). The voice coil 114 is wound around the voice coil former 110 in the conventional manner and extends along the axis 112 for sufficient distance to accommodate the reciprocal motion of the voice coil former 110, which is driven by energising the voice coil 114 with an electrical signal (this electrical signal is produced by electrical and/or electronic circuitry which is usually external to the loudspeaker enclosure (although crossover circuitry or the like may be present inside the enclosure); the skilled person understands the principles and apparatus involved in generating and transmitting these signals to the loudspeaker and, as these have no direct relation to the present invention, they are not described further herein); the voltage applied to the voice coil 114 produces a magnetic field which interacts with the magnetic field in the magnetic gap 108 to drive the voice coil former 110 to move along the axis 112. A sensing winding 118 is formed as a PCB (printed circuit board) extending around the voice coil former 110 (on either or both of the inner and outer surfaces of the voice coil former 110) underneath the voice coil 114 and extends axially beyond the voice coil 114 (the laminated sandwich structure of conductive and insulating layers forming the PCB may itself constitute the former). At the forward end of the magnetic gap 108, above the T-yoke pole, are provided an even number (four are shown) of neodymium (NdFeB) magnets 120, arranged as shown with alternating magnetic polarity. As in the conventional velocity-sensing designs, as the voice coil former 110 reciprocates in the magnetic gap 108 taking the sensing winding 118 with it, a voltage is induced in the sensing winding 118 by the magnetic field generated by the NdFeB magnets 120, and this voltage can be measured and used to determine the instantaneous velocity of the voice coil former 10. In the illustrated embodiment, the four cylinder neodymium magnets 120 have been added in a magnetic quadrupole orientation to form a secondary magnetic field that generates a motional emf in the velocity sensing windings proportional to the velocity of the voice coil former 110. The sensing windings are printed onto the voice coil former 110 using flexible PCB technology. This approach is lightweight and permits a complex winding pattern (described further below). The axial extent of the voice coil and of the velocity-sensing tracks are indicated by the dimensions D1 and D2, the secondary magnetic gap is indicated by A2, the overhang of the sensing winding is indicated by C2. Since the location of the sensing field is above the primary field, and since the field height A2 can be lower, the overhang C2 can be substantially higher than in a conventional arrangement. This allows $(BL)_{SC}$ to be linear over a much wider range of voice coil displacements than in a conventional loudspeaker.

Figure 6A:
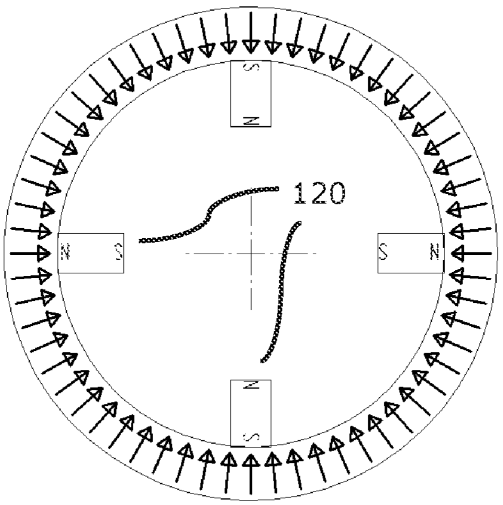
Figure 6B:
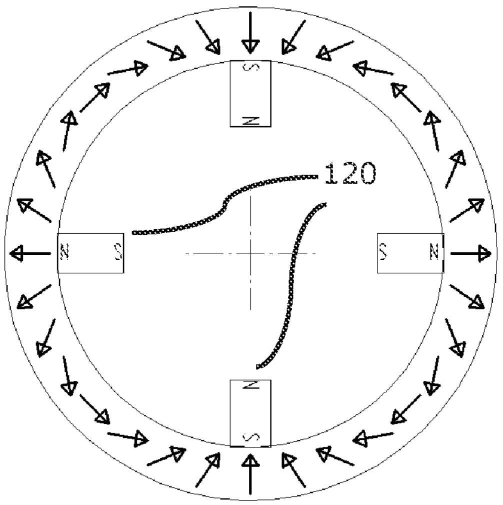

FIGS. 6*a* and 6*b* show the magnetic field orientation generated in the region of the ring magnet 102 and front plate 106, and in the region of the neodymium magnets 120 respectively. In this particular embodiment the two regions are separated axially, with the result that there is little interaction between the two magnetic fields and the first magnetic field in the primary gap 108 (in FIG. 6*a*) is almost completely radial and thus operates identically to a conventional motor system. The secondary magnetic field has a circumferential periodicity; in this embodiment, the magnetic field generated by the secondary magnetic circuit has an approximately quadrupole orientation with the radial field polarity changing twice around the circumference of the magnetic gap. It should be noted that many other secondary magnetic field geometries are possible, such as approximately dipole, approximately octupole, etc., essentially any in which there are an even number of radial field polarity changes. The secondary magnetic field must be closely matched to the winding arrangement of the sensing winding so that $(BL)_{SC}$ is high enough to provide sufficient velocity sensitivity. A quadrupole secondary field is a preferred embodiment as it is the lowest order of secondary field that provides rejection of rocking movement (of the voice coil former as it reciprocates) in the sensed signal, but other embodiments are possible provided that these are in geometric progression or disposed circumferentially so as to prevent rocking.

Figure 6C:
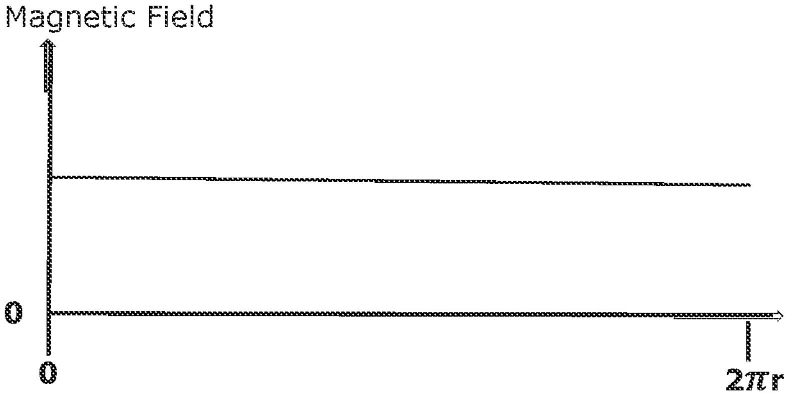
Figure 6D:
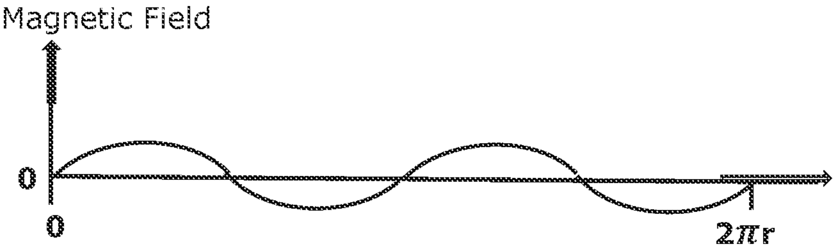
Figure 6E:
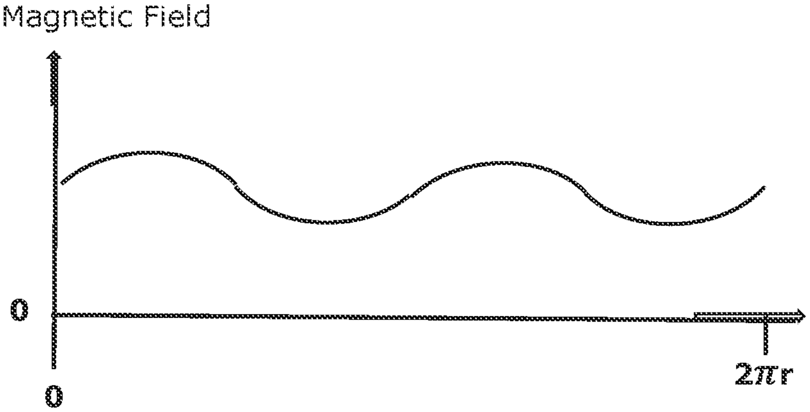

It should be noted that it is not necessary for the first and second magnet fields to be axially separated, and that in other embodiments there may be interaction between the two magnetic fields and the two regions could be superimposed. This does not negatively impact the performance of the sensing winding provided that the winding loops are arranged so as not to couple with the magnetic field generated as current flows in the voice coil. An example of this is shown in FIGS. 6*c* to 6*e*, illustrating in FIG. 6*c* the radial magnetic flux of the first magnetic field, in FIG. 6*d* the radial magnetic flux of the second magnetic field, and in FIG. 6*e* the radial magnetic flux when the first and second fields are superimposed at the same axial position. In this quadrupole example, there are two regions of slightly higher radial flux and two regions of slightly lower radial flux disposed around the circumference of the magnetic gap. The sensing winding is configured so as to have a circumferential periodicity which matches that of the second magnetic field.

Figure 7:
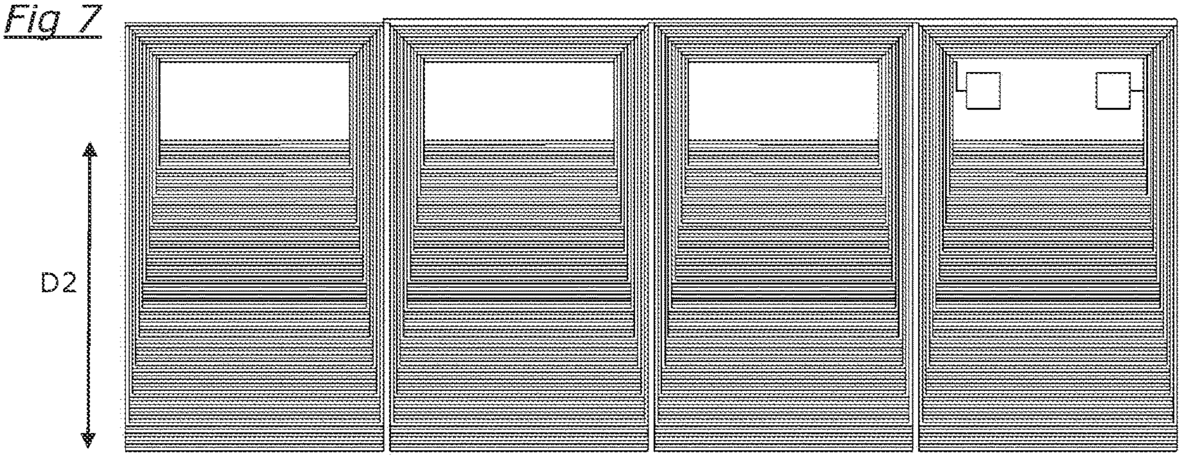
FIG. 7 shows schematically a sensing winding arrangement having two layers.
Figure 8:
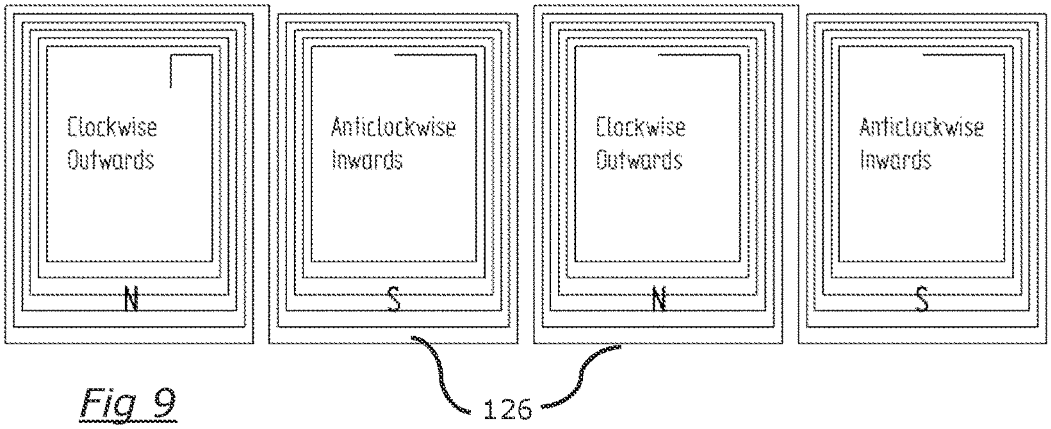
FIG. 8 shows one layer of the sensing winding arrangement of FIG. 7.
Figure 9:
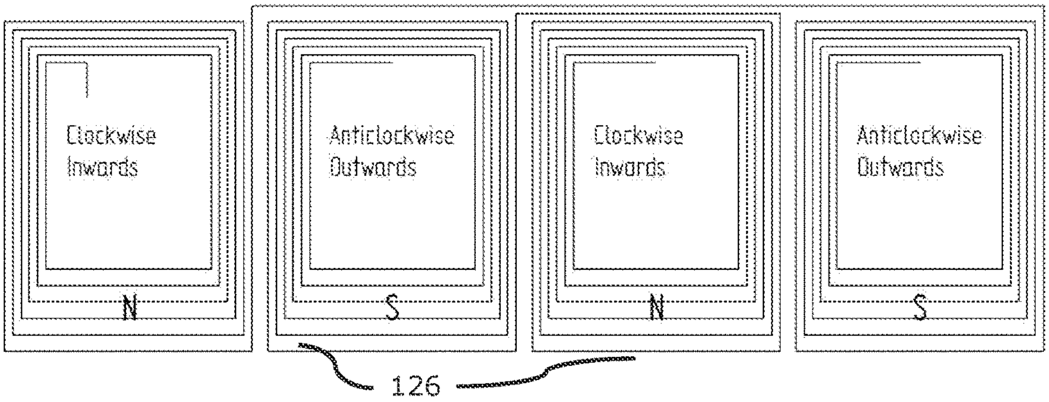
FIG. 9 shows the other layer of the sensing winding of FIG. 7.

FIG. 7 shows the PCB Gerber file for a quadrupole sensing winding consisting of two PCB layers (the drawing is a 2D representation of the winding which is formed circumferentially around the voice coil former). FIGS. 8 and 9 show the track arrangement on the separate layers with greater clarity. The arrangement here comprises a sensing winding with eight series-connected spirals formed as four loops 126 on each of the two PCB layers. The four loops in the layers of FIGS. 8 and 9 are superimposed axially and circumferentially so that adjacent loops 126 in a layer alternate in the direction they turn, and superimposed pairs of loops turn in the same direction. This winding arrangement is optimised in two aspects. Firstly, the lower part of the windings is located in the secondary magnetic field (marked D2 in FIG. 7); the individual tracks of the sensing winding in this region are spaced further apart than are the remainder of the tracks, are intended in use to be oriented substantially perpendicularly to or in the plane perpendicular to the reciprocation axis, and are designed to match the quadrupole field, and to provide an approximately constant $(BL)_{SC}$ over a very wide range of coil positions. Secondly, this winding arrangement is optimised to minimise coupling with the magnetic field that is generated as current flows in the voice coil. In this case, the motor system is almost axisymmetric and the magnetic field due to the voice coil is also approximately axisymmetric. The arrangement of the sensing winding has an equal number of aligned/superimposed pairs of clockwise and anti-clockwise tracks (about the axis of the voice coil loop) and hence zero coupling with the field from the voice coil. It will be appreciated that there are many variations of the same spiral arrangement with slight modifications, such as the order and orientation of the spirals, and also that the same approach can be used to develop sensing windings with any even order.

Figure 10:
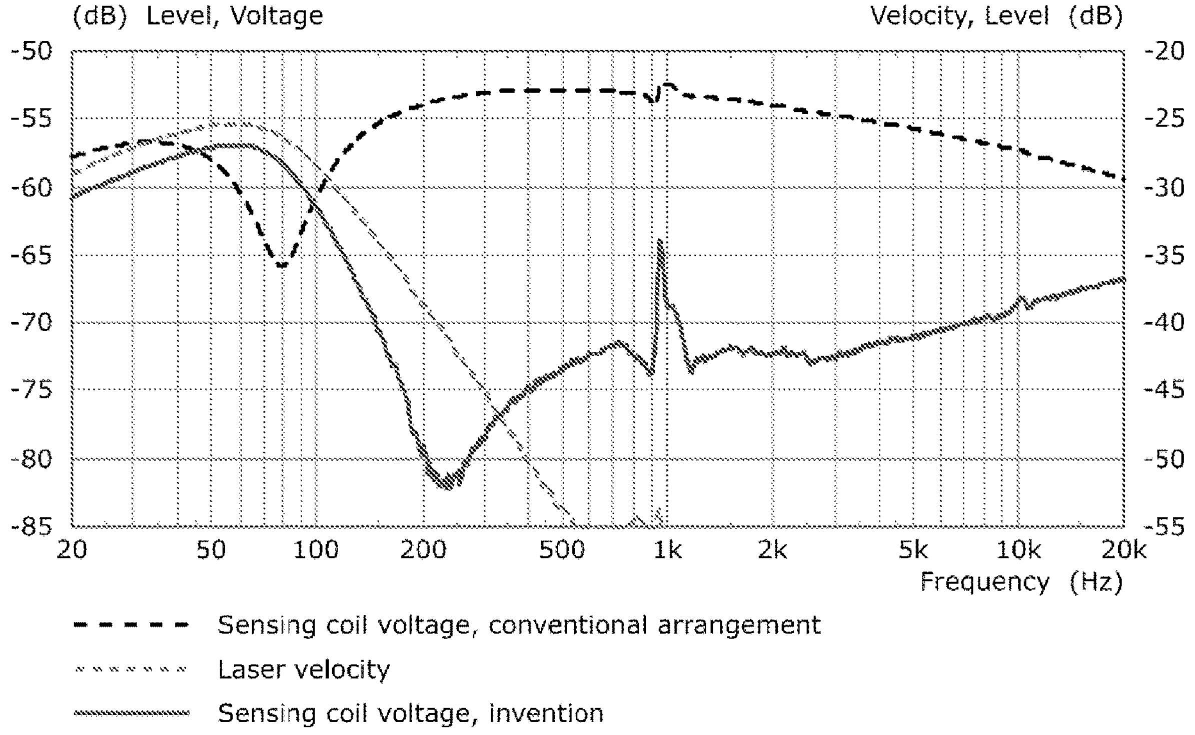
FIG. 10 is a graph illustrating the sensing winding voltage in a prior art loudspeaker, and the sensing winding voltage and actual velocity for a loudspeaker in accordance with the invention.

FIG. 10 shows the improvement in the sensing winding performance using the present invention compared to a conventional sensing winding directly wound over the voice coil and using the same magnetic gap. The frequency of the notch, indicating where the motional and mutual emf are equal, has increased by 1.5 octaves.

Figure 11:
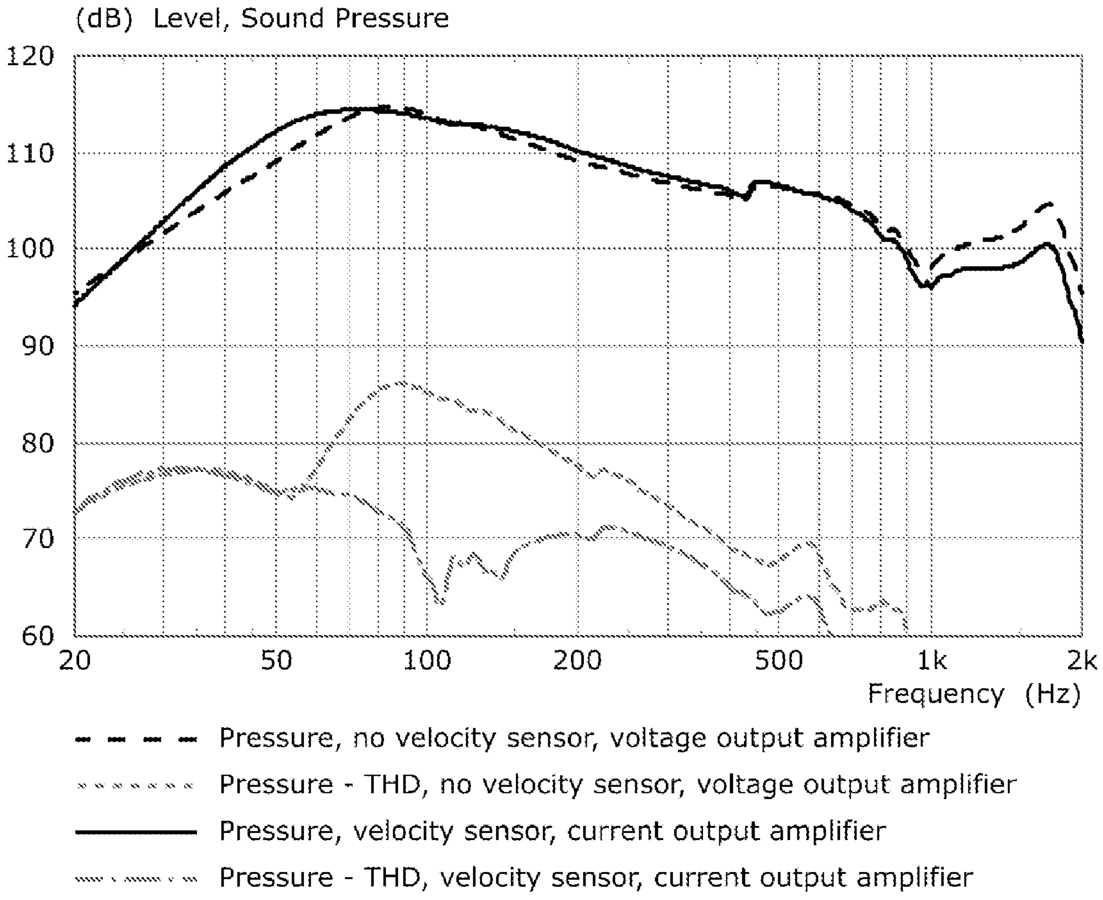
FIG. 11 is a graph showing fundamental SPL (sound pressure level) and THD (total harmonic distortion) SPL for a loudspeaker with a conventional voltage amplifier compared to a current amplifier with negative feedback from the velocity sensor.

FIG. 11 shows a comparison of the output and THD of a prototype loudspeaker using the velocity sensor described above driven firstly with a conventional low impedance (voltage output) amplifier and secondly with a high impedance (current output) amplifier with negative feedback from the velocity sensor signal. In this case the amount of negative feedback was adjusted to approximately match the response with the low impedance amplifier. The linear output of both systems is similar but the system with negative feedback from the velocity sensor has substantially reduced distortion.

Figure 12:
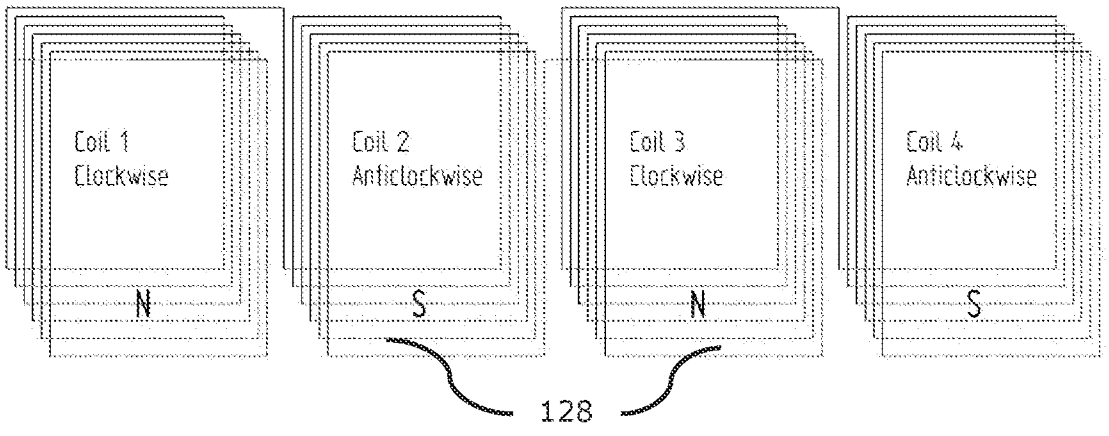
FIG. 12 is a schematic view of another example of a sensing winding arrangement.

FIG. 12 shows another sensing winding arrangement with four coils formed using two PCB track layers to allow the windings in each loop 128 to cross. Compared to the arrangement in FIGS. 7 to 9, this arrangement has the disadvantage that half the number of turns are possible for a given track spacing, and this will reduce the velocity sensitivity by half. However, the advantage is that as the voice coil former moves a more equal length of the sensing windings is submersed in the secondary magnetic field. Also, this winding arrangement allows the upper part of the coil (the part that is positioned away from the two magnetic gaps) to have almost the same number of clockwise and anticlockwise turns about the axis of the voice-coil and this helps to minimise electro-magnetic coupling between the sensing and voice coil.

Figure 13A:
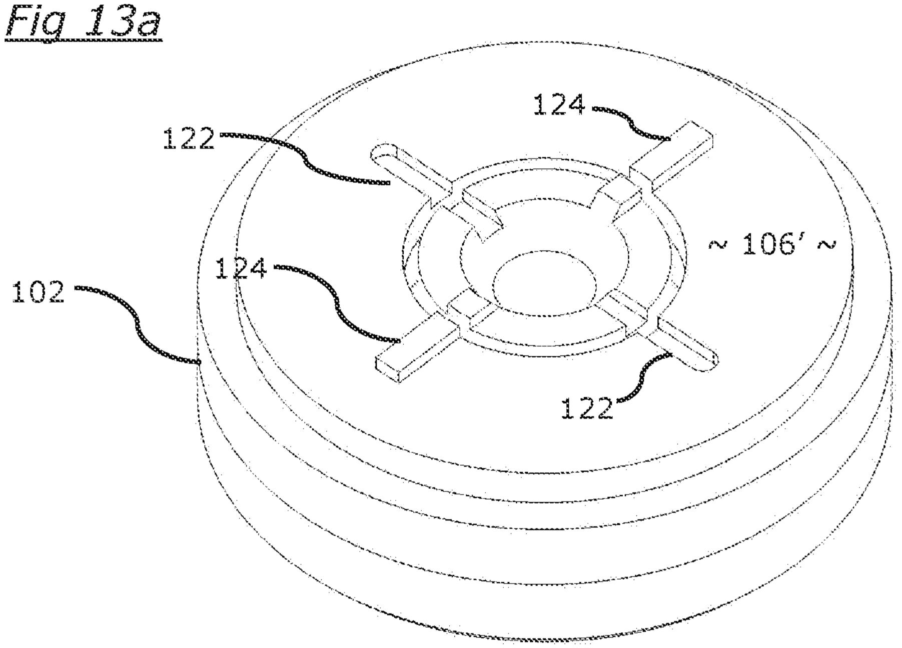
FIGS. 13*a* and 13*b* are schematic views of one possible loudspeaker drive magnet configuration for providing the magnetic field of FIG. 6*e*, without and with the voice coil former, respectively.
Figure 13B:
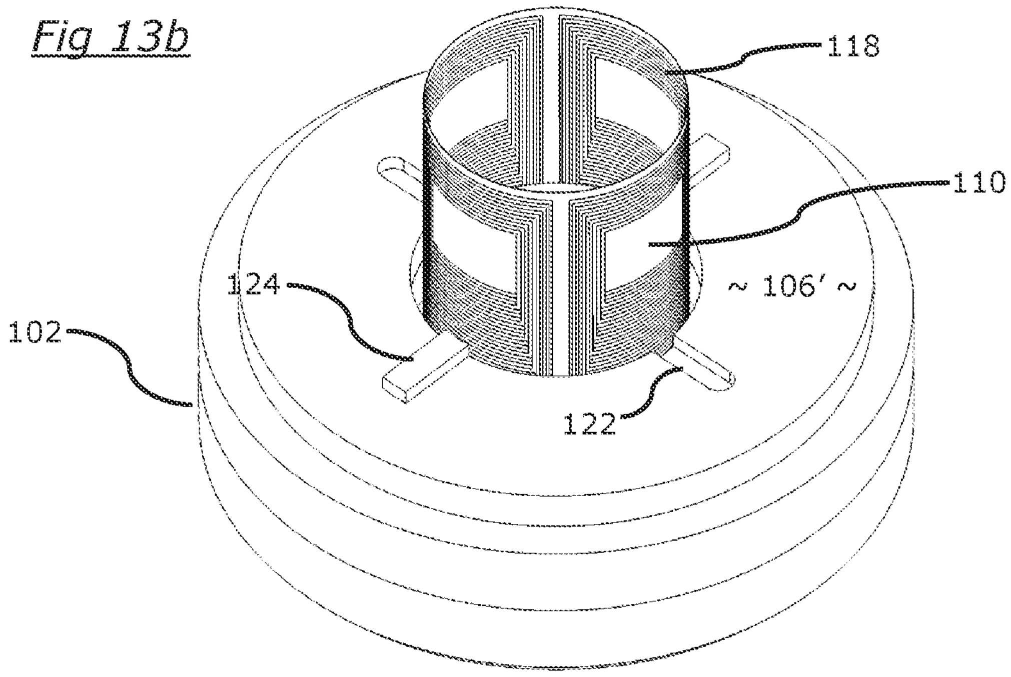
Figure 14A:
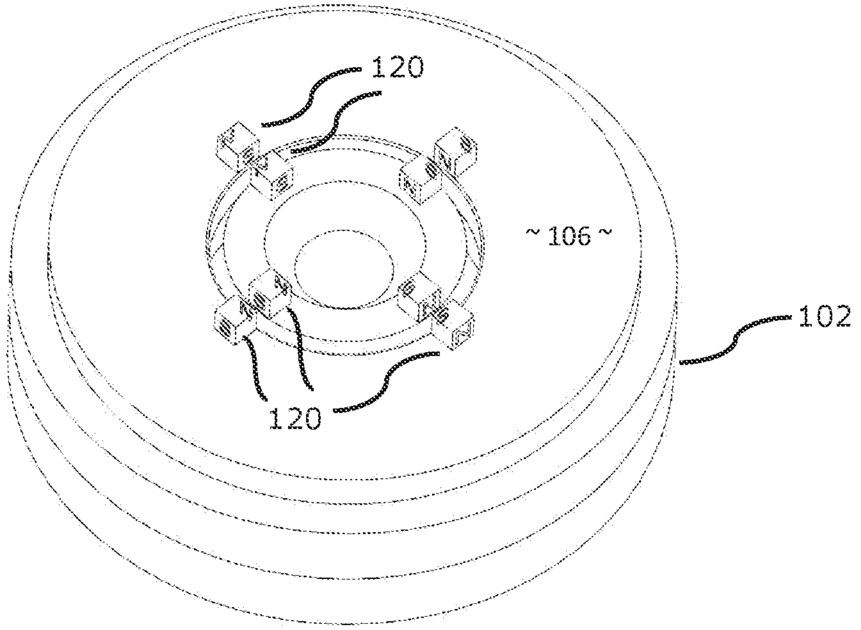
FIGS. 14*a* and 14*b* are schematic views of another possible loudspeaker drive magnet configuration for providing the magnetic field of FIG. 6*e*, without and with the voice coil former, respectively.
Figure 14B:
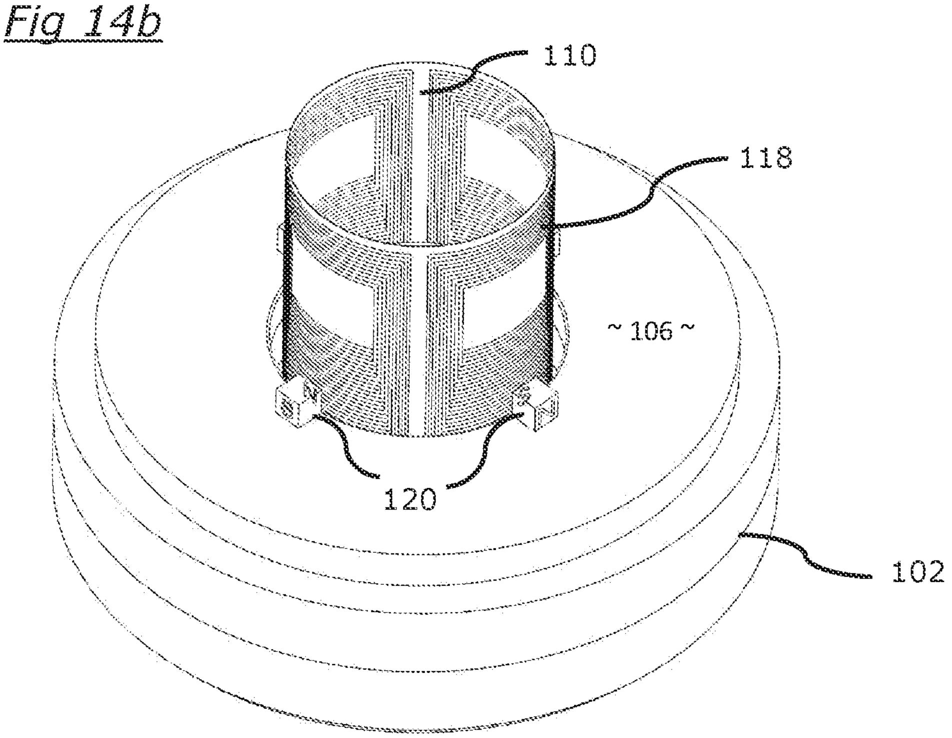

As will be apparent, there are many possible arrangements for the secondary magnetic field and gap. The example in FIG. 4 uses a completely separate set of neodymium magnets to create the secondary magnetic field but it is also possible to use a single magnetic circuit to generate the field for both the primary and the secondary gaps. FIGS. 13 and 14 show two possible alternative geometries (for increased clarity, FIGS. 13*a* and 14*a* show the geometry with the voice coil and former absent, while FIGS. 13*b* and 14*b* show the geometries with the former present and the sensing winding visible). In the FIG. 13 example, a series of alternating opposed pairs of notches 122 and ridges 122 is formed in the top plate 106' of the magnet arrangement to create the secondary magnetic field to energise the sensing winding 118 (in this case the geometry of the motor and the coil must be carefully designed to minimise mutual inductance). FIG. 14 shows an alternate arrangement to that in FIG. 4, in that pairs of neodymium magnets 120 create the field for the secondary gap. Steel pieces could be added, or the top plate 106 provided with notches and ridges as in FIG. 13, to increase the flux applied to the sensing winding and reduce stray magnetic field. When there is significant interaction between the primary and secondary gap and magnetic circuit it is necessary to optimise the coil geometry to minimise the mutual inductance.

It will be noted from FIGS. 13*b* and 14*b* that the sensing windings illustrated schematically in FIGS. 7 to 9 and 12 are not planar, but instead are "wrapped around" the voice coil former (which are cylindrical in FIGS. 13*b* and 14*b*) so that the portion of the sensing winding which is activated by moving in the second magnetic field (D2 in FIG. 7) is axial, circumferential and substantially perpendicular to the reciprocation axis at all circumferential positions, while the loop of each sensing winding is not planar but instead curved in one dimension.

It will of course be understood that many variations may be made to the above-described embodiment without departing from the scope of the present invention. For example, the present invention is principally described with reference to cylindrical voice coils and formers; however, the invention applies equally to non-circular arrangements, such as oval, elliptical or race track shaped (figure of eight, or triangular/square/polygonal with rounded corners), planar, or hexagonal voice coils and formers, or any shape being symmetrical in one or two orthogonal directions lying in the general plane perpendicular to the voice coil axis and having a central hole. Arrays of magnets could be used to energise the voice coil gap, and the invention is applicable to drivers with multiple coils and/or multiple gaps, to voice coil actuators and to other kinds of motor or actuator which incorporate suitable drive coils, including dual or multiple voice coil drivers. The second magnetic field may be offset from the first, allowing the overhang of the sensing winding perpendicular to the axis (D2 in FIG. 7) to be higher than the voice coil. As described, a single magnetic circuit could be used to generate both magnetic fields, or separate magnetic circuits could be used to generate each magnetic field, or a combination of a multiple magnetic circuits could be used to generate, in combination, the first and second magnetic fields. Only embodiments having one secondary magnetic field have been described, but there could be more than one second magnetic field, spaced along the axis. The invention has mainly been described herein with reference to the most common former and voice coil arrangement, where the voice coil is wrapped around the outside of the voice coil former; however, the principle of the invention is equally applicable to other former and voice coil arrangements, such as for example where the voice coil former is around the outside of the voice coil, where there are two voice coils, one outside and one inside the voice coil former, or where there two voice coil formers, one outside and one inside the voice coil. The word "around" used above and in the claims should be construed accordingly as encompassing all of these alternative arrangements, and not as implying that an element which is described as being around another element can only be around the outside, it encompasses arrangements where the element is around the inside.

Where different variations or alternative arrangements are described above, it should be understood that embodiments of the invention may incorporate such variations and/or alternatives in any suitable combination.

The invention claimed is:

1. A method of measuring the instantaneous velocity of a loudspeaker driver reciprocating in a magnetic field, the driver having a voice coil wound coaxially around a former in a helical path and a sensing winding arranged coaxially around the former, the driver being driven so as to reciprocate along a reciprocation axis by the application of an electric signal to the voice coil, the method comprising providing a first magnetic field arranged and adapted to couple primarily with the voice coil, providing a second magnetic field arranged and adapted to couple primarily with the sensing winding, and sensing the voltage induced in the second, sensing winding as it reciprocates axially in the second magnetic field, wherein the second magnetic field has an orientational periodicity which is circumferential in relation to the reciprocation axis and which orientational periodicity extends over at least a part of the length of the former along the reciprocation axis.

2. The method according to claim 1, comprising positioning the first and second magnetic fields at different locations along the axis.

3. The method according to claim 1, comprising superimposing the first and second magnetic fields.

4. The method according to claim 1, comprising applying the second, sensing winding to the former in a pattern such that the second, sensing winding does not couple with a magnetic drive field that is generated in the voice coil when the electric signal is applied to drive the voice coil.

5. The method according to claim 1, in which the first magnetic field is predominantly radial relative to the reciprocation axis.

6. A loudspeaker comprising:

a voice coil wound coaxially around a former in a helical path which together are adapted, when an electric signal is applied to the voice coil, to reciprocate along a reciprocation axis within a gap in a magnet arrangement so as to cause an acoustic diaphragm connected to the former to reciprocate along the reciprocation axis and radiate acoustic energy, the voice coil extending a first distance along the axis and the former, and a sensing winding arranged coaxially around the former and extending a second distance along the reciprocation axis, in which the magnet arrangement is adapted and configured to generate two magnetic fields, a first magnetic field primarily for driving the voice coil to reciprocate and located axially adjacent the first distance, and a second magnetic field located axially adjacent the second distance and adapted to couple primarily with the sensing winding, and in which the sensing winding is arranged around the circumference of the former in the form of an even number of loops, the loops being separately disposed around the circumference of the former but electrically connected to form a single winding, each loop extending around a loop axis which is substantially perpendicular to the reciprocation axis.

7. The loudspeaker according to claim 6, in which the first and second magnetic fields and the first and second distances overlap in the direction of the reciprocation axis.

8. The loudspeaker according to claim 6, in which the first and second magnetic fields and the first and second distances do not overlap in the direction of the reciprocation axis.

9. The loudspeaker according to claim 8 comprising two or more printed layers, in which the printed coils in one layer are aligned circumferentially around the reciprocation axis with the printed coils in an adjacent layer.

10. The loudspeaker according to claim 6, in which the second, sensing winding is formed on the outer surface of the former in one or more layers comprising a plurality of separate coils disposed circumferentially about the former, each coil comprising a plurality of adjacent turns extending around a loop axis.

11. The loudspeaker according to claim 10, in which circumferentially adjacent coils turn in alternating directions.

12. The loudspeaker according to any of claim 10, in which a portion of each coil is aligned perpendicularly to the reciprocation axis, and in which the turns in that portion of each coil are spaced apart from each other relative to the reciprocation axis by a greater distance than are the turns forming the remainder of that coil.

13. The loudspeaker according to any of claim 6, in which the sensing winding is in the form of a printed circuit formed on the inner or outer surface of the former.

14. The loudspeaker according to any of claim 6, in which the first distance is less than the second distance.

15. The loudspeaker according to any of claim 6, in which the magnet arrangement comprises separate first and second magnets for generating the first and second magnetic fields.

16. A former for a loudspeaker, the former comprising a voice coil wound coaxially around the former in a helical path, the former and voice coil being adapted to reciprocate along a reciprocation axis within a gap in a magnet arrangement so as to cause an acoustic diaphragm connected to the former to reciprocate along the reciprocation axis and radiate acoustic energy, the former comprising a sensing winding formed on the outer and/or inner surface of the former in one or more printed circuit layers comprising a plurality of separate sensing coils disposed circumferentially about the former, each coil comprising a plurality of adjacent turns, the sensing coils being separately disposed around the circumference of the former but electrically connected to form a single winding, each sensing coil extending around a loop axis which is substantially perpendicular to the reciprocation axis.

17. The former according to claim 16 comprising two or more printed layers, in which the printed sensing coils in one layer are aligned circumferentially around the axis with the printed sensing coils in an adjacent layer.

18. The former according to claim 16, in which a portion of each sensing coil is aligned perpendicularly to the reciprocation axis, and in which the turns in that portion of each sensing coil are spaced apart from each other by a greater distance relative to the reciprocation axis than are the turns forming the remainder of that sensing coil.

* * * * *